United States Patent

[11] 3,526,217

[72] Inventors Theodore J. Garske
1029 Churchill St.,
St. Paul, Minn. 55103
Walter A. Swanson
2545 Edgerton St.,
St. Paul, Minn. 55117
[21] Appl. No. 765,935
[22] Filed Oct. 8, 1968
[45] Patented Sept. 1, 1970

[54] POST MOUNTED COOKING UNIT
6 Claims, 4 Drawing Figs.
[52] U.S. Cl. ...................................................... 126/25,
126/30
[51] Int. Cl. ...................................................... A47j 37/00,
F24b 3/00
[50] Field of Search ........................................... 126/25,
25A, 9, 30

[56] References Cited
UNITED STATES PATENTS

| 750,742 | 1/1904 | Weston | 126/30 |
|---|---|---|---|
| 2,827,846 | 3/1958 | Karkling | 126/25UX |
| 3,176,676 | 4/1965 | Caldwell | 126/25(A)UX |
| 3,395,692 | 8/1968 | Johns | 126/30 |

FOREIGN PATENTS

| 127,210 | 8/1928 | Switzerland | 126/25(A) |

*Primary Examiner*—Charles J. Myhre
*Attorney*—Williamson, Palmatier and Bains

ABSTRACT: Outdoor cooking apparatus comprising a charcoal pan and a cooking utensil having centrally supported sleeve bearings by means of which they are slidably and rotatably mounted on an upright, ground-engaging post. The charcoal pan and cooking utensil are adjustably held on the post in the desired vertical position with respect to each other by friction locking devices which releasably engage the post.

Patented Sept. 1, 1970

3,526,217

INVENTORS
WALTER A. SWANSON,
THEODORE J. GARSKE
BY
Williamson, Palmatier
& Bains
ATTORNEYS

POST MOUNTED COOKING UNIT

BRIEF SUMMARY OF THE INVENTION

The outdoor cooking unit of this invention is particularly characterized by the removable and adjustable mounting of a plurality of cooking accessories on an upright post adapted to be supported on the ground. The cooking accessories are supported on the post in such a way that they may be easily released and slidably adjusted to a desired vertical position for proper cooking and for the convenience of the user.

These basic objectives are realized by specially designed accessory items in the form of a charcoal pan and cooking utensils having centrally disposed sleeve bearings which permit them to be slidably and rotatably mounted on an upright post. The elongated bearing sleeves guide the cooking accessories on the post, prevent them from tipping, as might be caused by unbalanced loading, and physically separate the contents thereof from the post.

A particularly advantageous feature of our improved cooking apparatus resides in the use of separate, friction locking devices to hold the several cooking accessories at the desired position of vertical adjustment on the post. In the preferred form of our invention, the locking devices consist of a friction collar embracing the post and an operating handle extending outwardly from the collar in supporting engagement with the underside of one of the cooking accessories. The collar is of slightly larger diameter than the post, and is canted from a horizontal position in which it is slidable on the post to an inclined position of locking engagement with the post by the weight of a charcoal pan or cooking utensil accessory on the handle.

These and other objects and advantages of our invention will become readily apparent as the following description is read in conjunction with the accompanying drawings wherein like reference numerals have been utilized to designate like elements throughout the several views.

Figure 1:
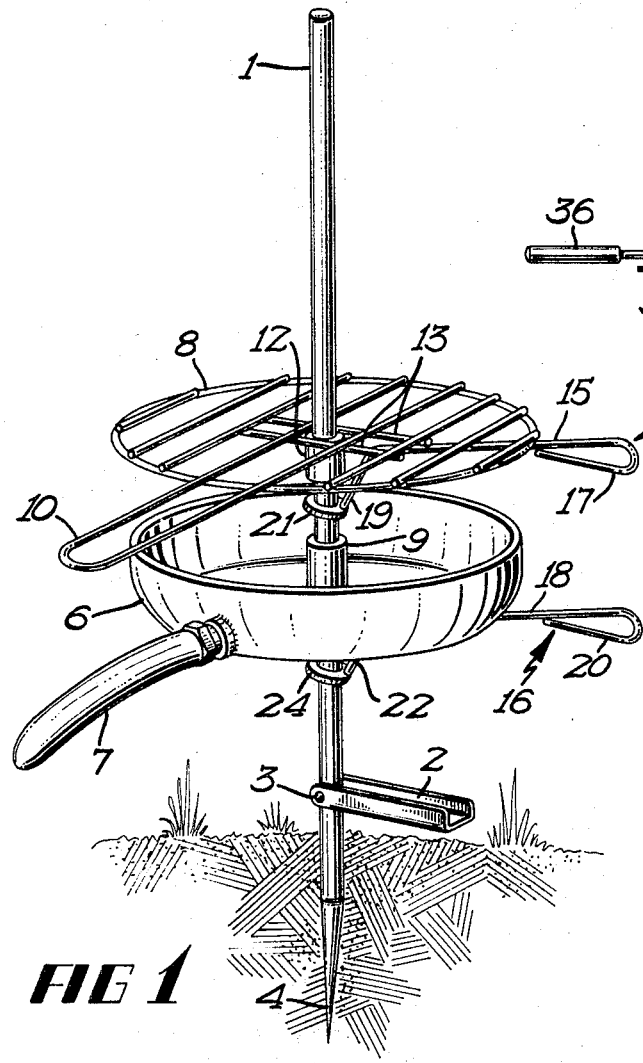
FIG. 1 is a perspective view of one embodiment of the cooking apparatus of this invention.

In the perspective view of FIG. 1, one form of the outdoor cooking apparatus of this invention is shown mounted on an upright post 1. In assembling the cooking apparatus, post 1 is first supported on the ground in the vertical position by either a base stand or by forcing it into the ground. The latter mode of supporting post 1 is shown in FIG. 1, push step 2 being utilized to press pointed end portion 4 of post 1 into the ground in the manner shown. Push step 2 is pivotally attached to the lower end of post 1 by a pivot pin 3 which permits channel-shaped step 2 to be folded or collapsed against post 1 longitudinally thereof when it is not being used. Shown mounted on post 1 in FIG. 1 are two cooking accessories 6 and 8. Item 6 is a pan-shaped charcoal container having a handle 7 and a centrally located mounting sleeve 9. The accessory designated by reference numeral 8 is a cooking utensil in the form of a grill having a handle 10 and a centrally disposed, downwardly depending mounting sleeve 12. Mounting sleeves 9 and 12 act as bearing elements to permit grill 8 and charcoal pan 6 to be adjusted vertically on post 1 and spaced the desired distance apart for the proper cooking of the particular food being prepared. Since bearing sleeves 9 and 12 are rotatable as well as slidable on post 1, accessory items such as grill 8 and charcoal pan 6 may not only be slidably moved to a conveniently accessible height and proper cooking location but may also be rotated as may be necessary and proper to bring the food being cooked to a particular position over the burning charcoal in pan 6.

In order to retain charcoal pan 6 and grill 8 in the desired vertical location on post 1, we provide friction-type locking devices 14 and 16 which are identical in shape and function. Locking device 14 is comprised of a handle portion 15 having a looped outer end grip 17, and an angled inner segment 19 by means of which it is secured to a collar 21. The corresponding parts of retention device 16 are designated by reference numerals 18, 20, 22 and 24. Friction collars 21 and 24 have central apertures of slightly larger diameter than post 1. The weight of grill 8 and charcoal pan 6 on outwardly projecting handle portions 15 and 18 causes the outer ends thereof to be tipped downwardly, thereby cocking or canting collars 21 and 24 to the positions shown in FIG. 1 wherein they are brought into locking engagement with post 1. Accessory items such as charcoal pan 6 and grill 8 may be removed from post 1 or slidably moved to a different position thereon by simply tilting handles 17 and 20 upwardly. This has the effect of disengaging friction collars 21 and 24 from post 1 by moving them into substantially horizontal positions. The offsetting of handle portions 15 and 18 of locking devices 14 and 16 with respect to friction collars 21 and 24 by means of angled segments 19 and 22 amplifies the leverage action on locking devices 14 and 16 by the weight of grill 8 and charcoal pan 6 to more firmly lock collars 21 and 24 in frictional engagement with post 1.

As may be noted with reference to FIG. 1, mounting sleeve 12 of grill 8 extends downwardly therefrom and is secured as by welding or soldering to cross braces 13. Bearing sleeve 9 is integrally joined to the bottom of charcoal pan 6 over a circular aperture therein, as by a weld joint indicated at 11, and extends upwardly to a point substantially even with the top of pan 6. Upwardly projecting sleeve 9 may thus also serve as a stop member to keep upper sleeve 12 or friction collar 21 from sliding downwardly into charcoal pan 6. In addition to permitting the adjustable mounting of accessories such as grill 8 and charcoal pan 6 on post 1, mounting sleeves 12 and 9 also function to hold grill 8 and pan 6 in horizontal positions and prevent them from tipping in spite of unbalanced loading.

Figure 2:
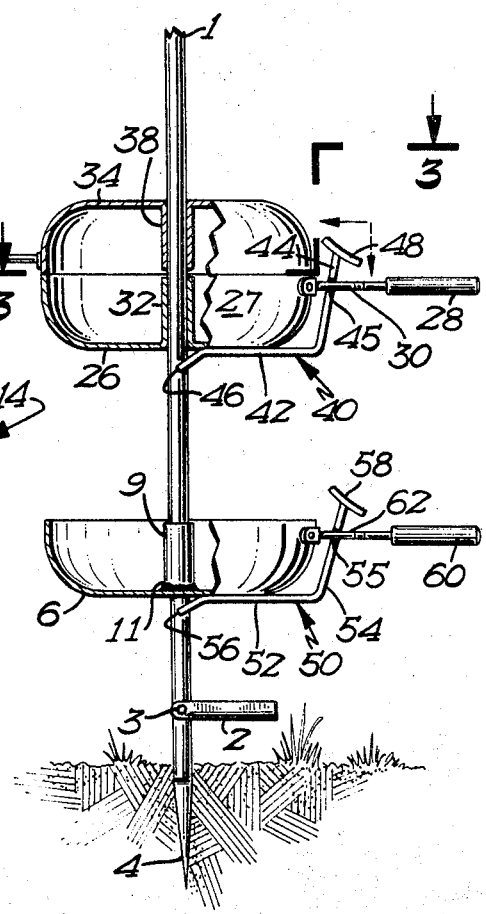
FIG. 2. is a front elevation view of a modified form of our cooking apparatus with parts thereof shown in section for additional clarity.
Figure 3:
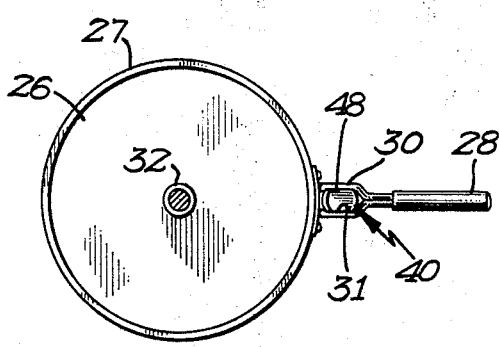
FIG. 3 is a horizontal section view taken along lines 3—3 of FIG. 2 and providing a top view of the cooking pan shown therein.
Figure 4:
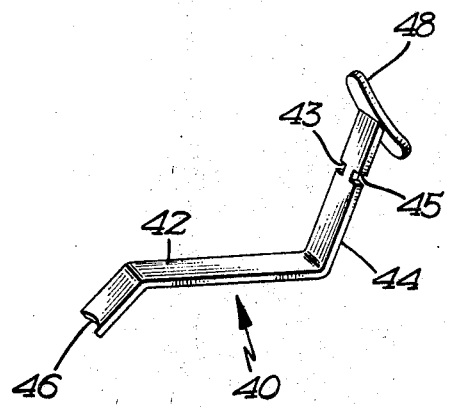
FIG. 4 is an enlarged perspective view of the friction locking device utilized with the cooking apparatus of FIG. 2.

In FIGS. 2, 3 and 4 we have illustrated a modified version of our outdoor cooking apparatus utilizing different types of friction locks and cooking accessories. The cooking utensil shown in FIG. 2 is a fry pan 26 having upwardly turned side walls 27 and a handle 28. Handle 28 is provided with a bifurcated inner end 30 forming an aperture 31 for a purpose hereinafter explained. Projecting upwardly from the bottom of fry pan 26 is a centrally located bearing or mounting sleeve 32 which may be either a separate piece attached to pan 26 or a part formed integrally therewith in the arrangement shown in FIG. 2. Pan 26 may be used either by itself as an open fry pan, or it may be closed with a cover 34 to provide a Dutch oven type of cooking utensil. Cover 34 has a handle 36 and a downwardly depending bearing sleeve 38 by means of which it is mounted on post 1 in direct alignment with pan 26. Sleeve 32, being slidable and rotatable on post 1, permits pan 26 to be adjusted vertically and swung horizontally to different angular positions to suit the convenience of the cook. Sleeve 32 also extends upwardly a sufficient height, preferably to a point substantially in alignment with the top of pan 26, to confine liquids within pan 26 and keep the contents thereof out of contact with post 1.

The friction locking device 40 utilized to retain pan 26 in the desired position on post 1 is most clearly shown in FIG. 4, and comprises an outwardly and upwardly projecting lock arm having a substantially horizontal portion 42 and an upwardly extending segment 44. The inner end 46 of locking device 40 is provided with an arcuate shape conforming substantially to the curvature of post 1. Upper thumb rest 48 serves as a means for actuating locking device 40 in and out of frictional contact with post 1, and notches 43 and 45 on segment 44 are constructed and arranged to engage bifurcated end 30 of handle 28. Referring now to FIGS. 2 and 3, locking device 40 is mounted on post 1 with respect to pan 26 in the manner shown with horizontal portion 42 supporting the bottom of pan 26 and upwardly inclined segment 44 extending through aperture 31 of bifurcated handle end 30. The opposite sides of bifurcated handle end 30. The opposite sides of bifurcated handle portion 30 pass through notches 43 and 45 as appears most clearly with respect to notch 45 in FIG. 2. Locking device 40 may be disengaged from post 1 to slide pan 26 to a different position thereon by pushing forwardly on thumb rest 48 in the direction indicated by the solid arrow in FIG. 2. Such an inwardly directed force on angled thumb rest 48 will serve to tilt arcuate contact portion 46 downwardly away from post 1. Downward pressure on thumb rest 48 in the direction indicated by the dotted arrow in FIG. 2 will operate to swing contact piece 46 back upwardly into frictional engagement with post 1.

Charcoal pan 6 shown in FIG. 2 is slidably positioned on post 1 by a mounting sleeve 9 in the manner described above with respect to FIG. 1. In the cooking arrangement shown in FIG. 2, pan 6 is supported by a locking device 50 which is identical to device 40 described above with respect to the mounting of fry pan 26. Parts 52 through 58 of locking device 50 correspond to similar portions 42 through 48 of locking device 40. Inclined segment 54 of device 50 extends upwardly through bifurcated portion 62 of charcoal pan handle 60. Inner contact end 56 of locking device 50 may be biased in and out of frictional engagement with post 1 by applying pressure to thumb rest 58 as described above with respect to locking arm 40.

The cooking utensil and charcoal pan arrangements shown in FIGS. 1 and 2 are intended to be illustrative only. The novel mounting sleeve and frictional locking device features described above could obviously be employed to support other types of cooking utensils in various arrangements on post 1. Also, it would be possible to support either grill 8 or pan 26 at a lower position on post 1 directly over an open, in-ground fire rather than using charcoal pan 6 as a heat source.

The entire cooking assembly could be supported by placing charcoal pan 6 on the ground and using it as a base stand. This arrangement could be used where hard or rocky soil makes it very difficult to drive pointed post end 4 into the ground. Post 1 would simply be inverted from the position shown in FIG. 1 with its flat end supported in bearing sleeve 9 of charcoal pan 6 and its pointed end 4 directed upwardly. To facilitate the use of the cooking apparatus in such a manner, pivotal foot stand 2 would be replaced by a foot block having an apertured end by means of which it could be removably mounted on post 1 and canted into frictional contact therewith by foot pressure on its outer end. The foot block would be removed when post 1 is inverted for support on pan 6 being used as a base stand.

We claim:

1. Cooking apparatus comprising:
an upright post supported on the ground at one end thereof;
a cooking utensil slidably mounted on said post, said cooking utensil having a central, bearing sleeve slidably mounted on said post; and
a releasable locking device holding said cooking utensil at a desired vertical positon on said post, said locking device comprising an inner, post-engaging portion adapted to frictionally contact said post, and an outwardly extending handle portion upon which said cooking utensil rests, said inner portion being canted into locking engagement with said post by the weight of said cooking utensil acting downwardly on said handle.

2. Cooking apparatus as defined in claim 1 wherein:
a charcoal container is slidably mounted on said post below said cooking utensil by means of a bearing sleeve, said bearing sleeve for said charcoal container extending upwardly from the bottom, center thereof to a point substantially even with the top of said container, whereby said bearing sleeve serves as a stop member to prevent said cooking utensil from sliding downwardly into said charcoal container.

3. Cooking apparatus as defined in claim 1 wherein:
said post engaging portion of said locking device comprises a friction collar having a central aperture of slightly larger diameter than said post and slidably positioned thereon, and said handle portion is affixed to and extends outwardly from said collar in supporting engagement with said cooking utensil.

4. Cooking apparatus as defined in claim 1 wherein:
said cooking utensil is in the form of a pan having upwardly turned side walls and said bearing sleeve therefor is secured to the bottom of said pan and projects upwardly therefrom to a point substantially even with the top of said side walls.

5. Cooking apparatus as defined in claim 4 and further including:
a cover on said pan in vertical alignment therewith, said cover having a bearing sleeve projecting downwardly from the center thereof by means of which said cover is slidably and rotatably mounted on said post.

6. Cooking apparatus as defined in claim 1 wherein:
said utensil has a handle with an aperture therein; and
said handle portion of said locking device has an intermediate portion which supportably engages the bottom of said utensil, an upwardly projecting portion which extends through said aperture in said handle, and a thumb rest at the top of said upwardly projecting portion, the application of pressure to said thumb rest in different directions serving to cant said inner portion in an out of locking engagement with said post.